(12) United States Patent
Drevet et al.

(10) Patent No.: US 12,109,790 B1
(45) Date of Patent: Oct. 8, 2024

(54) COMPOSITE PANELS HAVING A MELAMINE IMPREGNATED PROTECTIVE LAYER

(71) Applicant: Columbia insurance Company, Omaha, NE (US)

(72) Inventors: Anthony Drevet, Shanghai (CN); Philippe Erramuzpe, Augusta, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 16/580,668

(22) Filed: Sep. 24, 2019

Related U.S. Application Data (60) Provisional application No. 62/735,607, filed on Sep. 24, 2018.

(51) Int. Cl.
| | | |
|---|---|---|
| *B32B 27/40* | (2006.01) | |
| *B32B 7/02* | (2019.01) | |
| *B32B 7/12* | (2006.01) | |
| *B32B 27/18* | (2006.01) | |
| *B32B 27/30* | (2006.01) | |

(Continued)

(52) U.S. Cl.
CPC ............... *B32B 27/40* (2013.01); *B32B 7/02* (2013.01); *B32B 7/12* (2013.01); *B32B 27/18* (2013.01); *B32B 27/304* (2013.01); *B32B 29/06* (2013.01); *E04F 15/02423* (2013.01); *B32B 2264/102* (2013.01); *B32B 2264/104* (2013.01); *B32B 2264/107* (2013.01); *B32B 2451/00* (2013.01); *B32B 2471/00* (2013.01); *B32B 2607/00* (2013.01)

(58) Field of Classification Search
CPC ...... E04F 15/00; E04F 15/02423; B32B 7/02; B32B 7/12; B32B 27/18; B32B 27/304; B32B 27/40; B32B 29/06; B32B 2264/102; B32B 2264/104; B32B 2264/107; B32B 2451/00; B32B 2471/00; B32B 2607/00
See application file for complete search history.

(56) References Cited

U.S. PATENT DOCUMENTS

| | | |
|---|---|---|
| 795,399 A | 7/1905 | Laybrun |
| 2,182,291 A | 12/1939 | Andre |

(Continued)

FOREIGN PATENT DOCUMENTS

| | | |
|---|---|---|
| CA | 2852656 A1 | 4/2013 |
| CN | 1043279 | 12/1989 |

(Continued)

OTHER PUBLICATIONS

Lauefenberg, Theodore L. et al., Phosphate-Bonded Ceramic-Wood Composites: R&D Project Overview and Invitation to Participate (Oct. 2004).

(Continued)

*Primary Examiner* — Christopher M Polley
*Assistant Examiner* — Sathavaram I Reddy
(74) *Attorney, Agent, or Firm* — Miller & Martin PLLC (57) ABSTRACT

The disclosed panels generally comprise a protective layer composed of a paper impregnated with a melamine resin. The protective layer may be incorporated into a panel comprising a rigid composite core, such as a plastic composite core or a mineral composite core. Disclosed are also methods for manufacturing the panels.

20 Claims, 9 Drawing Sheets

(51) Int. Cl.
  *B32B 29/06* (2006.01)
  *E04F 15/024* (2006.01)

(56) References Cited

U.S. PATENT DOCUMENTS

| | | | |
|---|---|---|---|
| 3,908,725 | A | 9/1975 | Koch |
| 4,724,187 | A | 2/1988 | Ungar |
| 6,146,252 | A * | 11/2000 | Martensson ............ B26D 7/086 |
| | | | 264/162 |
| 6,248,812 | B1 | 6/2001 | Symons |
| 6,440,538 | B1 | 8/2002 | Ungar |
| 6,617,009 | B1 | 9/2003 | Chen |
| 6,986,934 | B2 | 1/2006 | Chen |
| 7,155,871 | B1 | 1/2007 | Stone |
| 7,169,460 | B1 | 1/2007 | Chen |
| 7,211,310 | B2 | 5/2007 | Chen |
| 7,220,297 | B2 | 5/2007 | Pipko |
| 7,261,947 | B2 | 8/2007 | Reichwein |
| 7,419,717 | B2 | 9/2008 | Chen |
| 7,527,856 | B2 | 5/2009 | Thiers |
| 7,544,423 | B2 | 6/2009 | Horton |
| 7,678,425 | B2 | 3/2010 | Oldorff |
| 7,763,345 | B2 | 7/2010 | Chen |
| 7,770,350 | B2 | 8/2010 | Moriau |
| 7,866,115 | B2 | 1/2011 | Pervan |
| 7,877,956 | B2 | 2/2011 | Martensson |
| 7,998,547 | B2 | 8/2011 | Feigin |
| 8,021,741 | B2 | 9/2011 | Chen |
| 8,099,919 | B2 | 1/2012 | Garcia |
| 8,171,691 | B1 | 5/2012 | Stone |
| 8,234,829 | B2 | 8/2012 | Thiers |
| 8,431,054 | B2 | 4/2013 | Pervan |
| 8,631,624 | B2 | 1/2014 | McIntosh |
| 8,834,992 | B2 | 9/2014 | Chen |
| 8,875,465 | B2 | 11/2014 | Martensson |
| 9,745,758 | B2 | 8/2017 | Baert |
| 9,783,996 | B2 | 10/2017 | Pervan |
| 9,994,010 | B2 | 6/2018 | Pervan |
| 2001/0007710 | A1 * | 7/2001 | Liu ........................ B32B 27/20 |
| | | | 428/207 |
| 2002/0025446 | A1 | 2/2002 | Chen |
| 2002/0046527 | A1 | 4/2002 | Nelson |
| 2003/0024199 | A1 | 2/2003 | Pervan |
| 2004/0016196 | A1 | 1/2004 | Pervan |
| 2004/0086678 | A1 * | 5/2004 | Chen ........................ E04F 15/02 |
| | | | 428/44 |
| 2004/0200154 | A1 | 10/2004 | Hunter |
| 2004/0248489 | A1 | 12/2004 | Hutchison |
| 2004/0255538 | A1 | 12/2004 | Ruhdorfer |
| 2005/0003160 | A1 | 1/2005 | Chen |
| 2005/0136234 | A1 | 6/2005 | Hak |
| 2005/0176321 | A1 * | 8/2005 | Crette ........................ B32B 5/18 |
| | | | 442/154 |
| 2005/0281997 | A1 | 12/2005 | Grah |
| 2006/0032175 | A1 * | 2/2006 | Chen ........................ B32B 3/06 |
| | | | 52/578 |
| 2006/0070321 | A1 | 4/2006 | Au |
| 2007/0130872 | A1 | 6/2007 | Goodwin |
| 2008/0261019 | A1 | 10/2008 | Xianfeng |
| 2009/0011670 | A1 | 1/2009 | Wisenbaker |
| 2010/0247937 | A1 | 9/2010 | Liu et al. |
| 2011/0167744 | A1 | 7/2011 | Whispell |
| 2011/0247285 | A1 | 10/2011 | Wybo |
| 2011/0300392 | A1 | 12/2011 | Vermeulen |
| 2013/0171377 | A1 | 7/2013 | Aravamudan |
| 2013/0192158 | A1 * | 8/2013 | Cappelle ................. B32B 27/32 |
| | | | 52/588.1 |
| 2014/0290158 | A1 | 10/2014 | Meersseman |
| 2014/0356594 | A1 | 12/2014 | Chen |
| 2015/0159379 | A1 | 6/2015 | Meersseman |
| 2015/0167320 | A1 | 6/2015 | Meersseman |
| 2015/0290968 | A1 * | 10/2015 | Hannig ................. E04F 15/102 |
| | | | 428/192 |
| 2016/0083965 | A1 * | 3/2016 | Baert ................. E04F 15/02188 |
| | | | 52/309.15 |
| 2016/0369507 | A1 | 12/2016 | Pervan |
| 2017/0298639 | A1 | 10/2017 | Song |
| 2018/0171631 | A1 | 6/2018 | Klug |
| 2018/0258650 | A1 | 9/2018 | Meersseman |
| 2018/0291638 | A1 | 10/2018 | Pervan |
| 2019/0010711 | A1 | 1/2019 | Pervan |

FOREIGN PATENT DOCUMENTS

| | | |
|---|---|---|
| CN | 1052819 | 7/1991 |
| CN | 2193915 | 4/1995 |
| CN | 1113850 | 12/1995 |
| CN | 1118771 | 3/1996 |
| CN | 1189566 | 8/1998 |
| CN | 1194202 | 9/1998 |
| CN | 1245855 | 3/2000 |
| CN | 1446993 | 10/2003 |
| CN | 1482166 | 3/2004 |
| CN | 2642917 | 9/2004 |
| CN | 1656291 | 8/2005 |
| CN | 2765969 | 3/2006 |
| CN | 1792986 | 6/2006 |
| CN | 1850712 | 10/2006 |
| CN | 1911997 | 2/2007 |
| CN | 2880871 | 3/2007 |
| CN | 101003990 | 7/2007 |
| CN | 101042014 | 9/2007 |
| CN | 101115616 | 1/2008 |
| CN | 200720034739.X | 1/2008 |
| CN | ZL 200620075187.2 | 2/2008 |
| CN | 101173554 | 5/2008 |
| CN | 201071580 | 6/2008 |
| CN | 201128262 | 10/2008 |
| CN | 101323188 | 12/2008 |
| CN | 101367977 | 2/2009 |
| CN | 1004623981 | 2/2009 |
| CN | 101386516 | 3/2009 |
| CN | 201209309 | 3/2009 |
| CN | 101423349 | 5/2009 |
| CN | 101446128 | 6/2009 |
| CN | 1101487336 | 7/2009 |
| CN | 101545309 | 9/2009 |
| CN | 101564922 | 10/2009 |
| CN | 201339298 | 11/2009 |
| CN | 101614068 | 12/2009 |
| CN | 101767362 | 7/2010 |
| CN | 201539080 | 8/2010 |
| CN | 101487336 | 10/2010 |
| CN | 201679203 | 12/2010 |
| CN | 202023326 | 12/2010 |
| CN | 202023326 U | 12/2010 |
| CN | 101955614 | 1/2011 |
| CN | 101613503 | 5/2011 |
| CN | 101698749 | 10/2011 |
| CN | 102245690 | 11/2011 |
| CN | 102287038 | 12/2011 |
| CN | 202265980 | 6/2012 |
| CN | 20232451 | 7/2012 |
| CN | 201120467334 | 7/2012 |
| CN | 201120467683 | 7/2012 |
| CN | 202483139 | 10/2012 |
| CN | 102803177 | 11/2012 |
| CN | 107165376 | 9/2017 |
| CN | 207144220 | 3/2018 |
| DE | 202017100592 | 5/2017 |
| EP | 2060389 | 5/2009 |
| EP | 2202056 | 6/2010 |
| EP | 2263867 | 3/2012 |
| EP | 2248665 | 9/2016 |
| ES | 2268547 | 3/2007 |
| FI | 114462 | 10/2004 |
| GB | 518239 | 2/1940 |
| JP | 671731 U | 10/1994 |
| JP | 7223856 | 8/1995 |
| JP | 2000054528 | 2/2000 |
| JP | 2000297496 | 10/2000 |
| JP | 2000303394 | 10/2000 |
| JP | 2001140401 | 5/2001 |
| JP | 2002274928 | 9/2002 |

(56) References Cited

FOREIGN PATENT DOCUMENTS

| | | |
|---|---|---|
| JP | 2009132078 | 6/2009 |
| JP | 5839097 | 1/2016 |
| KR | 100710919 | 4/2007 |
| KR | 20110045402 | 5/2011 |
| KR | 20130077823 | 7/2013 |
| RU | 2081135 | 6/1997 |
| RU | 2329362 | 7/2008 |
| RU | 2379249 | 1/2010 |
| WO | 2001083888 | 11/2001 |
| WO | 2001085642 | 11/2001 |
| WO | 2001094716 | 12/2001 |
| WO | 2006084513 | 8/2006 |
| WO | 2010081860 | 7/2010 |
| WO | 2012/061300 | 5/2012 |
| WO | 2017072657 | 5/2017 |
| WO | 2018034614 | 2/2018 |
| WO | WO-2018068197 A1 * | 4/2018 ............. B32B 5/245 |
| WO | 2018234561 | 12/2018 |

OTHER PUBLICATIONS

Suzhou Mango New Building Materials Co., Ltd, Water Resistant HPL Veneer Laminated Mgo Board for Exterior Wall (2008).
Aqua-Step; Promotional Website, Internet, Allegedly Nov. 24, 2009.
Machine Translation of CN 201539080 U (Year: 2015).

* cited by examiner

COMPOSITE PANELS HAVING A MELAMINE IMPREGNATED PROTECTIVE LAYER

CROSS-REFERENCE TO RELATED APPLICATIONS

This application titled "Composite Panels Having a Melamine Impregnated Paper Wear Layer" is a non-provisional application claiming the benefit to Provisional Application No. 62/735,607 filed Sep. 24, 2018 and titled "Solid Polymer-Based or Mineral-Based Core Flooring and Wall Panel Having Melamine Impregnated Paper Wear layer," which is hereby incorporated by reference in its entirety as if set forth below.

TECHNICAL FIELD

Embodiments of the presently disclosed technology relate to new and improved flooring planks, wall coverings, or other decorative panels, and more particularly flooring planks, wall coverings, or other decorative panels comprising a melamine-impregnated protective layer bonded to a composite core, such as a plastic composite core or a mineral composite core.

BACKGROUND

Ceramic or porcelain tiles and planks are widely used as floor coverings because of their waterproof properties and superior surface durability. However, one disadvantage of traditional ceramic or porcelain tiles and planks is installation often takes several days and can be a messy process due to the use of adhesive, mortar, and grout. Satisfactory installation often requires a competent professional installer and the removal process can be very disruptive and costly.

While there have been attempts to simplify the installation method for ceramic and porcelain tiles and planks, such as that described in U.S. Pat. No. 8,631,624, experience in the field has demonstrated that those products are not performing satisfactorily. Generally, such alternate methods require installing the ceramic tiles without the use of glue and often without grout as well; however, ceramic tiles produced using these methods tend to be brittle and crack over time over, especially if installed over an uneven subfloor.

The disadvantages described above are among the reasons why thermoplastic-based or polymer-based flooring, and particularly polyvinylchloride flooring, are greatly appreciated by the end user. Several types of thermoplastic flooring already exist on the market, such as products commonly known as vinyl flooring, LVP/LVT flooring, WPC, and the like. Such types of flooring bring additional features such as higher rigidity, sound reduction, and better footstep comfort when compared to ceramic or porcelain tiles in addition to waterproofing and ease of assembly.

The visual appeal of thermoplastic-based alternatives to ceramic and porcelain tiles has been improved by use of embossed-in-register technology, deeper beveling, the use of high-resolution printed images, and efforts to lower gloss, but almost all thermoplastic flooring products on the market continue to use a plastic-based protective layer. This protective layer is generally made of polyvinyl chloride, but some alternative protective layers are made utilizing polyethylene terephthalate, polyurethane, or polypropylene. The core, décor layer, and the protective layer are generally made of the same type of polymer and fused together through a thermo-bonding process.

Plastic protective layers can be unattractive. Indeed, when a plastic protective layer is employed, the surface of the finished product tends to have a slightly dull appearance and what is commonly called in the flooring industry a "plastic look." In contrast, ceramic and porcelain tiles are said to have a much more aesthetically pleasing, "natural" appearance.

To improve the surface durability of those thermoplastic-based flooring products, a finish is generally applied on top of the plastic protective layer. This finish is, in most cases, a urethane coating which comprises corundum, silicone dioxide particles, ceramic beam, or diamond particles. However, the effects of such coatings are limited, and only serve to slightly improve the micro-scratch resistance of the surface.

Thus, there remains a need for an improved flooring product that is substantially waterproof, easy to install, has improved scratch resistance, yet presents a durable and pleasing "natural" look and feel. Likewise, there remains a need for a process by which such an improved flooring product may be easily and inexpensively manufactured. Embodiments of the presently disclosed technology are directed to these and other considerations.

SUMMARY

Embodiments of the presently disclosed technology include a panel comprising a protective layer formed of a paper impregnated with a melamine resin, a décor layer comprising a thermoplastic film, the décor layer disposed below the protective layer, an adhesive layer bonding an upper surface of the décor layer to a lower surface of the protective layer, and a rigid core comprising a primary component and a secondary component and disposed below the décor layer.

In some embodiments, the protective layer can comprise abrasion-resistant particles (e.g., aluminum oxide, silicon dioxide, ceramic beam, diamond particles, or a combination thereof).

In some embodiments, the protective layer is substantially transparent. In some embodiments, the protective layer has a weight of from 30 g/m² to about 150 g/m².

In some embodiments, wherein the thermoplastic film of the décor layer is selected from the group consisting of poly-vinyl chloride, polyethylene, polypropylene, polyurethane, or a combination thereof. In some embodiments, the décor layer is laminated to an upper surface of the core.

In some embodiments, the primary component of the core comprises one of a thermoplastic or an inorganic compound and the secondary component comprises calcium carbonate, kaolin, wallasonite, calcium silicate, or a combination thereof. In some embodiments, the core further comprises wood fibers in the amount of 30% or less by weight of the core. In some embodiments, the core comprises about 25% to about 45% polyvinylchloride and from about 45% to about 65% calcium carbonate. In some embodiments, the core comprises about 40% to about 55% magnesium oxide and about 20% to about 25% magnesium salt, such as magnesium chloride or magnesium sulfate.

In some embodiments, the panel has a deep scratch resistance as measured by ISO 1518 of 20N to 30N.

In some embodiments, the panel further comprises an edge locking system.

Embodiments of the presently disclosed technology include a panel comprising a protective layer comprising a paper impregnated with a melamine resin and an adhesive, the melamine resin further comprising abrasion-resistant particles; a décor layer comprising a thermoplastic film, the décor layer disposed below and bonded to the protective layer; and a rigid core layer, the rigid core layer comprising a primary component and a secondary component and disposed below the décor layer.

In some embodiments, wherein the protective layer comprises a top surface of the panel, and has a top surface having a hardness of at least 70 shore D.

In some embodiments, the adhesive is selected from the group of polyurethane, polyester, polyethylene, ethyl vinyl acetate, nylon, polyolefin, polyvinyl acetate, acrylic, urethan. In some embodiments, the adhesive is a melted film.

In some embodiments, the core can be produced by extrusion, calendaring, continuous process or a combination of these.

Embodiments of the presently disclosed technology include a panel comprising a protective layer formed of a decor paper impregnated with a melamine resin, an adhesive layer bonding an upper surface of the core to a lower surface of the protective layer, and a rigid core layer comprising a primary component and a secondary component and disposed below the protective layer.

BRIEF DESCRIPTION OF THE DRAWINGS

The particular features and advantages of the presently disclosed technology as well as other objects will become apparent from the following description taken in connection with the accompanying drawings in which.

DETAILED DESCRIPTION

Embodiments of the presently disclosed technology include new and improved flooring planks, wall coverings, or decorative panels comprising a melamine-impregnated protective layer bonded to a composite core.

As used throughout this disclosure, the term "panel" is intended to reference some or all of at least flooring planks, wall coverings, or other decorative panels and is not intended to limit the scope of this disclosure. Normal usage of the presently disclosed panels may occur in a variety of locations including, but not limited to, residences (e.g., living areas, bathrooms, kitchens, basements), commercial spaces, offices, gyms, studios, or stores. While reference throughout this disclosure is made expressly to panels, it is understood that the embodiments of the present disclosure may be useful in other applications.

As used herein, a "plastic composite core" may refer to a core having a plastic component and an inorganic component. In some embodiments, the composite core may comprise at least 20% by weight of a plastic (e.g., polyvinyl chloride (PVC), polyethylene (PE), polyethylene terephthalate (PET), polyurethane (PU), ethylene vinyl acetate (EVA), ABS, and polypropylene (PP)), and a filler (e.g. calcium carbonate, kaolin, wallasonite, calcium silicate, or a combination thereof). It is understood that the type of filler and plastic can vary greatly depending on design needs. The inorganic component may comprise fiber cement, gypsum, plaster, magnesium oxide, or other cements or concretes, such as magnesium oxychloride cements. As used herein, a "mineral composite core" includes an inorganic compound and a filler. In embodiments where the composite core is a mineral composite core, the composite core may contain about 0 to 30% by weight of wood fibers and in an example embodiment, about 8% by weight of wood fibers.

In the past, it has been challenging to use a protective layer including melamine resin on top of a non-wood-based core, such as a composite core (e.g., a primarily polymer-based or mineral-based core having less than about 20% by weight of wood fibers) because:
  (a) traditional melamine resins used for wood-based panels do not adhere well to non-wood-based panels; and
  (b) melamine resins require high temperatures to cure, but polymer-based panels are sensitive to temperature.

Some attempts have been made to use a melamine resin protective layer on top of a polymer-based core, such as described in U.S. Pat. Nos. 9,611,659 and 9,745,758. However, in those patents, the top layer comprises several layers of impregnated paper (commonly called "HPL" or "High Pressure Laminate"). The use of HPL makes the fabrication process slow and expensive. Additionally, both during the manufacturing process and as a finished product, HPLs are known to undergo significant structural changes in reaction to changes in the environment, such as changes in temperature and/or humidity, due to the relatively large quantity of resin and paper used in those processes.

Embodiments of the presently disclosed technology include a panel with high surface durability with a natural look and feel, and a core suitable to be profiled with a locking system to make installation and disassembly easy, fast, and clean. For instance, the panels show increased durability through surface micro-scratch resistance, deep scratch resistance, and heat resistance. Due to the manufacturing processes discussed below, it is possible to manufacture a panel with a composite core and having a single layer of melamine-impregnated paper as a protective layer. As discussed in more detail below, in some embodiments, the protective layer may include embossing to provide texture to the plank and provide a natural look and feel.

Figure 12:
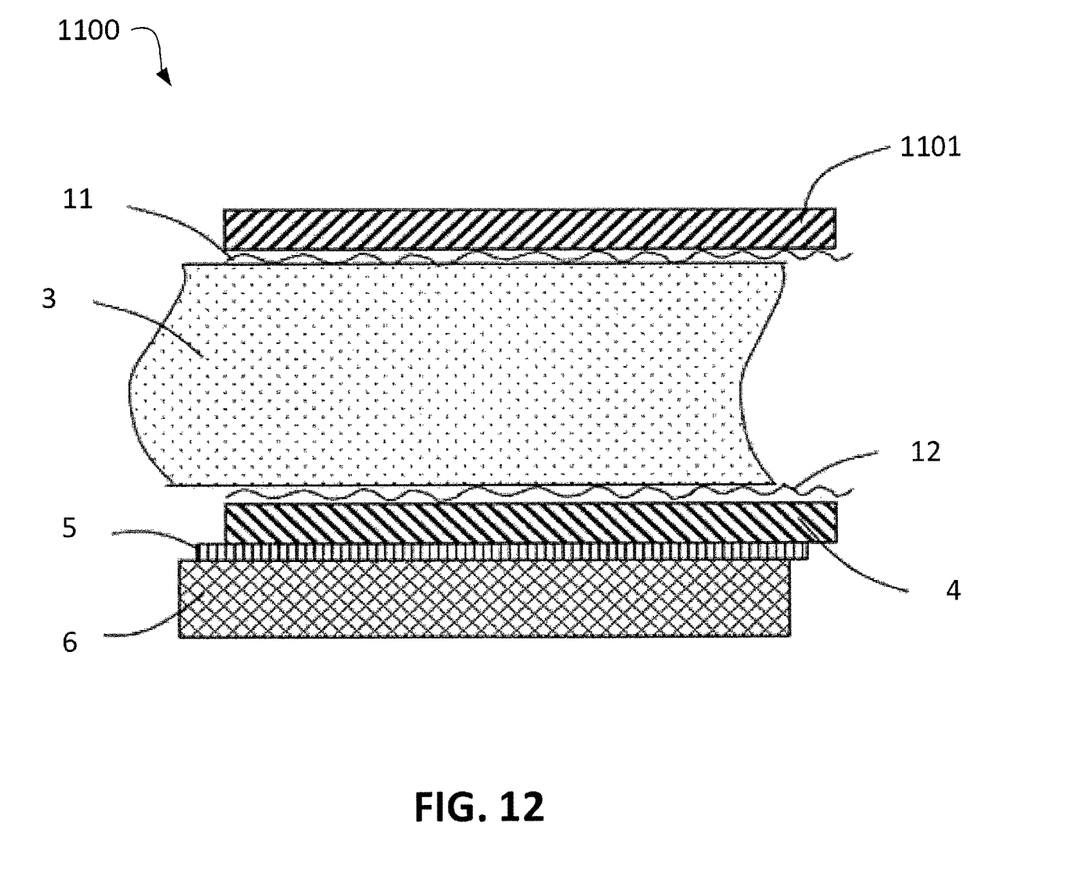
FIG. 12 is a cross-sectional view of an eighth embodiment of a panel according to the present disclosure.
Figure 13:
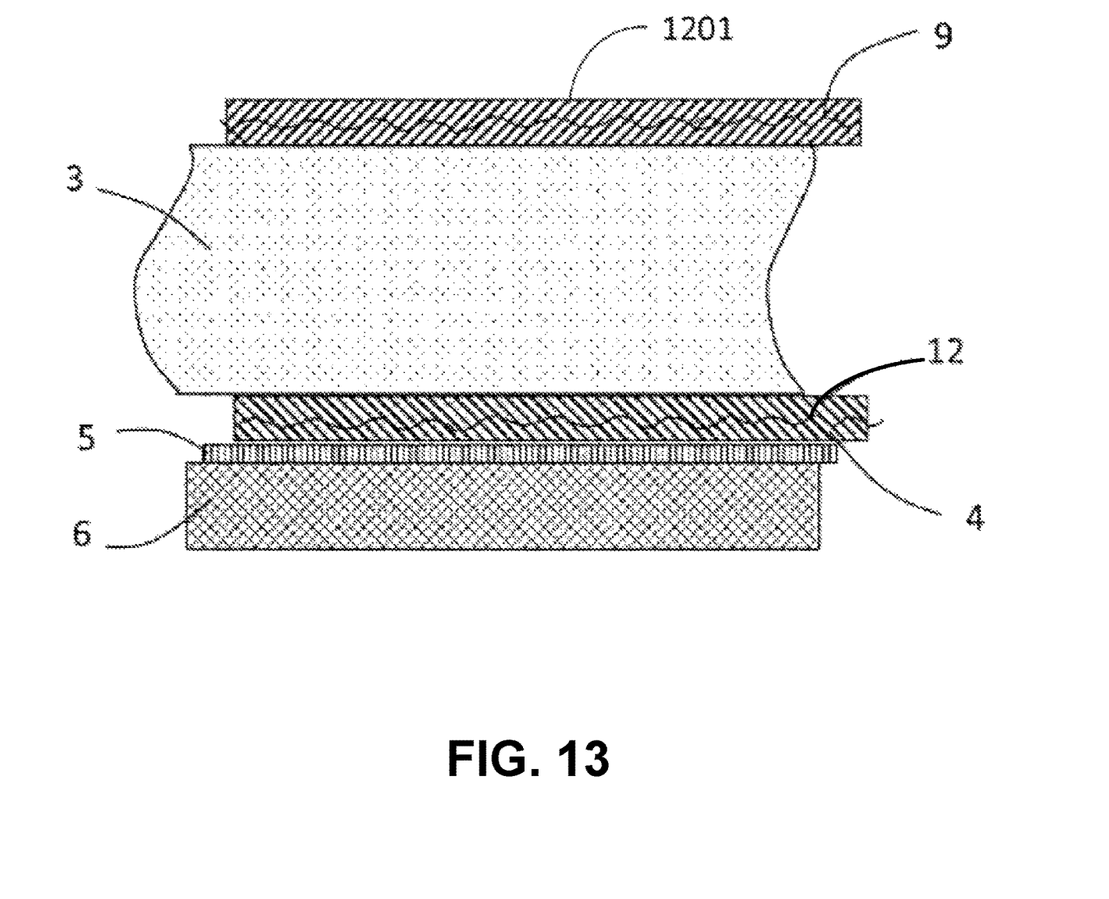
FIG. 13 is a cross-sectional view of a ninth embodiment of a panel according to the present disclosure.

FIGS. 1-9 and 12-13 illustrate various example embodiments of panels comprising a plurality of layers. In some embodiments, as illustrated in FIGS. 1-9, this plurality of layers can generally comprise a protective layer, a décor layer, and a core. In some embodiments, as illustrated in FIGS. 12-13, the plurality of layers can generally comprise a combined protective layer and décor layer, and a core. However, as discussed in greater detail below, the panels can include various other types of layers serving a variety of purposes.

As used herein, the term "protective layer" may refer to a layer providing protection against wear caused by normal usage of the planks, including but not limited to abrasion-resistance, scratch-resistance, and/or water-proofing. In some embodiments, the protective layer can comprise a paper impregnated with melamine resin. In other embodiments, the protective layer can be a combined décor layer and protective layer, in which a décor layer is impregnated with melamine resin. In some embodiments, the paper or décor layer can be impregnated with the melamine resin by the manufacturing processes described in FIGS. 8a-11.

In some embodiments, the paper used in the protective layer can be a transparent paper. In some embodiments, the paper can have a weight of from 15 g/m² to 70 g/m², and more specifically from 45 g/m² to 58 g/m². In some embodiments, the paper can be impregnated with a melamine resin such that the final weight of the protective layer can be from 30 g/m² to 150 g/m² depending on the starting weight of the paper. After impregnation with the resin, the protective layer can be substantially transparent due to the transparency of the resin, the thinness and weight of the paper, and the amount of cellulose fibers contained in the paper.

In embodiments utilizing a combined décor layer and protective layer, the décor layer can comprise a décor paper having a weight of from 60 g/m² to 80 g/m² and in an example embodiment, a weight of around 75 g/m². In some embodiments, the décor paper can be impregnated with a melamine resin in an amount of about 1 to 3 times the paper weight.

In some embodiments, the protective layer may additionally comprise abrasion-resistant particles (e.g., aluminum oxide, silicon dioxide, ceramic beam, and diamond particles) that may resist wear and tear during normal usage of the panels. In embodiments where abrasion-resistant particles are used, the protective layer can contain from about 15 g/m² to about 100 g/m² abrasion-resistant particles. In some embodiments, the protective layer can contain from about 20 g/m² to about 50 g/m² abrasion-resistant particles, about 25 g/m² to about 50 g/m² abrasion-resistant particles, about 30 g/m² to about 50 g/m² abrasion-resistant particles, about 40 g/m² to about 50 g/m² abrasion-resistant particles.

In embodiments incorporating a separate décor layer, to improve the clarity of the décor layer beneath, it may be preferable to use a lightweight paper having relatively less cellulosic fibers to be more transparent. However, lighter-weight papers contain less hard or abrasion-resistant particles diminishing the wear and scratch-resistance of the finished product. Thus, in an example embodiment incorporating a lighter-weight paper (e.g., a paper having a weight of about 25 g/m²), a polyurethane adhesive containing hard particles can be used to bond the décor layer to the core. Those skilled in the art would understand that the protective layer can be substantially transparent because it is made of a thin paper and the resin used is transparent.

The protective layer can be bonded either directly or indirectly to the core. In some embodiments, the protective layer may be bonded to an additional layer (e.g., a décor layer or an upper sublayer). For instance, the protective layer can be bonded using an adhesive (e.g., PU, polyester, PE, EVA, nylon, polyolefin, PVA, acrylic, urethane). In some embodiments, the protective layer can be bonded to the core via a lamination process, such as cold or hot pressing.

In some embodiments, the panels can comprise a composite core such as a plastic composite core or a mineral composite core. For instance, the core can comprise a primary component and a secondary component. In embodiments comprising a plastic composite core, the primary component can be a thermoplastic material. Suitable thermoplastic materials can include PVC, PP, PE, EVA, PET, PU, or a combination thereof. In embodiments where the core is a mineral composite core, the primary component may be a mineral-based material. Suitable mineral-based materials can include calcium silicate, fiber cement, magnesium oxide, gypsum, fired or unfired clay, or a combination thereof. In some embodiments, the primary component can be present in an amount of from about 10 to about 30% by weight, about 10 to about 15% by weight, about 15 to about 20% by weight, about 20% to about 25% by weight, and about 25% to about 30% by weight.

In some embodiments, the secondary component can be a filler, such as calcium carbonate, kaolin, wallasonite, calcium silicate, fly ash, or a combination thereof. In some embodiments, the secondary component can be present in an amount of from about 30 to about 70% by weight, about 35% to about 65% by weight, about 40% to about 60% by weight, about 45% to about 55% by weight, and about 50% to about 65% by weight.

In some embodiments, the core can comprise a minimal amount of wood-based component in an amount of from about 0% to about 30%, about 5% to about 10%, about 10% to about 30%, about 15% to about 20%, or about 20% to about 30%. The wood-based material may comprise any type of wood or natural fibers known in the art. In accordance with the above, example raw material makeups (excluding additional additives) of the core compositions are shown in Table 1 below.

TABLE 1

|        | Component 1 | Component 2 | Component 3      |
|--------|-------------|-------------|------------------|
| Core 1 | CaCo3 (65%) | PVC (25%)   |                  |
| Core 2 | CaCo3 (55%) | PVC (25%)   | Wood fibers (10%)|
| Core 3 | CaCo3 (45%) | PVC (45%)   | Wood fibers (5%) |
| Core 4 | MgO (55%)   | MgCl2 (25%) | Wood fibers (10%)|
| Core 5 | MgO (40%)   | MgCl2 (20%) | Wood fibers (30%)|

In an example embodiment, the plastic composite core can be a highly-filled, rigid PVC core. A highly-filled core can comprise a percent by weight of filler that is at least double that of the percent by weight of PVC. For instance, the amount of filler can be approximately 65% by weight of the core and the amount of thermoplastic can be 25% by weight of the core (e.g., 65% CaCo3 and 25% PVC). As used herein, "rigid" may refer to a core that is substantially free of a plasticizer or other flexibility-imparting material.

A core such as this may be produced by a variety of different techniques, such as extrusion, co-extrusion, hot press, calendaring, or continuous press.

The core of the present invention can be solid or foamed.

The thermoplastic composite core of the present invention may be made of one layer or a plurality of layers.

In some embodiments, the core may comprise other additives such as foaming agents, heat stabilizers, wax, and impact modifiers to adjust other properties of the core.

In other embodiments, the core may be a mineral composite core. A mineral composite core may be a core that includes a primary component comprised of an inorganic compound and a secondary component comprised of a filler. For instance, in some embodiments, the primary component may be magnesium oxide. In other embodiments, the primary component may be calcium silicate, fiber cement, magnesium oxide, gypsum, perlite, fired or unfired clay, magnesium chloride, or a combination thereof. In some embodiments, the composite mineral core may comprise one or more additional components comprised of one or more of a filler, an additive, a foaming agent, a binder, such as wood fibers, or a reinforcing component, such as a fiberglass board or fiberglass fibers. In some embodiments, the composite mineral core may comprise a secondary component comprising a magnesium salt, such as magnesium chloride or magnesium sulfate.

In some embodiments, the density of the core may be varied depending on the application. For example, for a flooring application, the density of the mineral composite core can be between about 1200 kg/m² to about 1500 kg/m². In contrast, for a wall application, a lighter density core is preferred, such as a mineral composite core having a density of about 800 kg/m² to about 1200 kg/m². As used herein, the density of the board may refer to the calculation of dividing the weight of the specimen by the volume of the specimen (width×thickness×length).

Various methods are known in the art to adjust the density of the mineral composite core. For instance, in some embodiments, a lightweight filler (e.g., perlite) or polystyrene may be added. In other embodiments, the fiber content may be increased (e.g., to 40% or less of wood fibers) or a foaming agent (e.g., sodium bicarbonate or azodicarbonamide) may be used. Additionally, in some embodiments, natural fibers, such as cellulose, wood fibers, or bamboo fibers, or cork particles may be incorporated to increase flexibility. Natural fibers within the core can also be incorporated to improve the strength of the locking system. In some embodiments, the mineral composite core can comprise from about 3% to about 15% by weight of natural fibers. Depending on the type of inorganic compound used, the mineral composite core may be too brittle for use, so a reinforcing material can be used to impart additional strength and flexibility to the board. In some embodiments, one or more fiberglass mesh layers may be used to strengthen the core.

In some embodiments, the mineral composite core can additionally include a binder. The type of binder can be important for providing adequate locking strength for the locking system mating protrusions and receptacles. In some embodiments, the binder may be magnesium sulfate, magnesium chloride, or a combination thereof. To provide a suitable substrate for a flooring material, the binder content used therein can be 50% by weight or less. Table 2 illustrates example embodiments of the core composition comprising magnesium oxide:

TABLE 2

| Use | Name | Chemical | MgO core type 1 | MgO core type 2 |
|-----|------|----------|-----------------|-----------------|
| Binder | Magnesium Oxide | MgO | 36% | 51% |
| Hardener | Magnesium Chloride | MgCl₂ | 23% | |
| Hardener | Magnesium Sulfate | MgSO₄ | | 30% |
| Modifying agent | Ferrite Sulfate/Phosphoric acid | FeSO₄, H₃PO₄ | 6% | |
| Filler | Wood/Bamboo fibres | | 16% | 7% |
| Filler | Perlite | | 11% | 4% |
| Reinforcing material | Glass Fiber | | 8% | 8% |
| | Total | | 100% | 100% |

In some embodiments, the core can be waterproof. The core can be solid or foamed.

Embodiments of the presently disclosed panels exhibit improved scratch resistance as compared to currently-available thermoplastic core products (e.g., SPC, WPC and RCB).

For instance, panels as provided by the present disclosure (e.g., Table 1 and Table 2) were tested using the Laminate Floor Coverings—Test Method For The Determination of Micro-Scratch Resistance, EN 16094 (2012), procedure B, which requires a sample surface be checked for scratches after 160 revolutions of a Martindale test machine. As compared to SPC, WPC, and RCB products on the market, which exhibited notable scratching after 160 revolutions, panels of the present disclosure can endure between 200 and 10,000 revolutions before exhibiting noticeable scratches, as exhibited in Table 3.

Additionally, as exhibited in Table 3, panels of the present disclosure show improved deep scratch resistance when tested according to ISO 1518.

TABLE 3

| | Micro scratch resistance (EN 16094) | Deep scratch resistance (ISO 1518) |
|---|---|---|
| Traditional WPC flooring (CaCO₃ (45%), PVC (45%), wood fibers (5%) | First scratch appears between 50 and 160 cycles | 7N to 14N |
| Traditional SPC flooring (CaCO₃ (45%), PVC (45%), foam agent (5%) | First scratch appears between 50 and 160 cycles | 10N to 17N |

TABLE 3-continued

Figure 1:
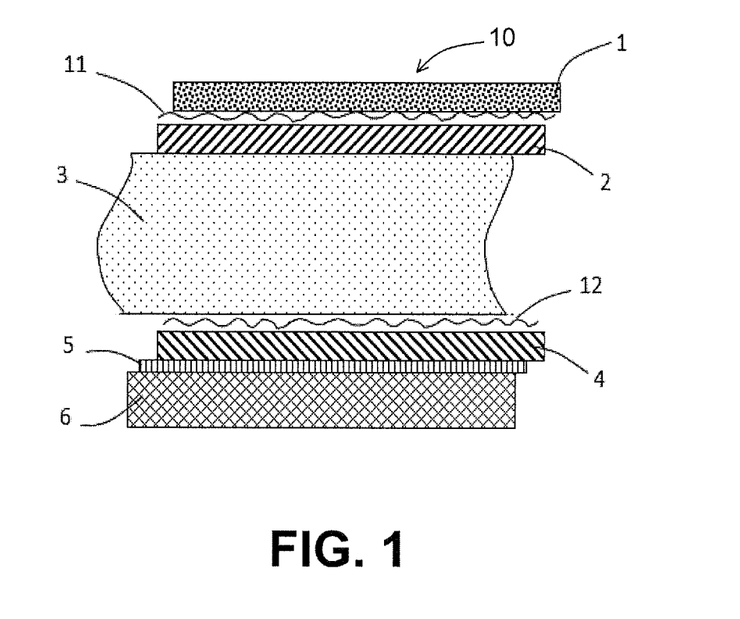
FIG. 1 is a cross-sectional view of a first embodiment of a panel according to the present disclosure, the panel comprising a waterproof solid polymer-based or mineral-based core and a protective layer comprising a melamine-impregnated paper.

|  | Micro scratch resistance (EN 16094) | Deep scratch resistance (ISO 1518) |
|---|---|---|
| Embodiments of the Present Disclosure (e.g., MgO (55%), MgCl$_2$ (25%), and Wood Fibers (10%) with construction similar to FIG. 1) | First scratch appears after 200 cycles | 20N to 30N |

The presently disclosed panels also have improved heat resistance as demonstrated by the "cigarette burn test method" described in EN 438-2. When tested via EN 438-2, the described panels have no mark or slight marking due to a cigarette burn whereas traditional vinyl, SPC or WPC flooring show a moderate to severe mark.

In some embodiments, the core can be waterproof and structurally rigid enough to be profiled with a glueless locking system.

In some embodiments, the adhesive selected to be combined with the melamine resin has a high transparency when applied over the décor layer. Transparency of the adhesive can be measured by applying the adhesive on a uniform white film and then measuring the color difference ($\Delta a$, $\Delta b$, $\Delta c$, $\Delta E$) between the areas with the adhesive and without the adhesive using, for instance a spectrophotometer. Ideally the $\Delta E$ is less than 1 after application of the adhesive. In some embodiments, the adhesive is heat-resistant from at least 130° C. and up to about 200° C.

In some embodiments, a polyurethane adhesive resin (resistant to temperature up to about) 200° C. can be used to reduce the pressing time. In some embodiments, the polyurethane adhesive resin is water-based to dry quickly to facilitate packaging of the panels at the end of the manufacturing process.

As discussed in more detail below with respect to FIGS. 1-9, the panels may have various additional layers including a décor layer (e.g., a layer comprising a decorative pattern or image that can in some instances be printed on it by rotogravure or digital print technology), one or more adhesive layers (e.g., polyurethane, polyester, polyethylene, ethyl vinyl acetate, nylon, polyolefin, polyvinyl acetate, acrylic, urethane), one or more balancing layers, one or more cushioning layers, or one or more sublayers (e.g., cork, ethyl vinyl acetate, polyethylene, polypropylene, polyurethane, or PET). In some embodiments, the one or more sublayers may be a thermoplastic sublayer, such as a sublayer composed of a thermoplastic material (e.g., PVC).

Turning now to the figures where various example embodiments of panels are illustrated and reference numerals are used to refer to certain components of the depicted panels, the embodiments illustrated in the figures are merely example embodiments and are not intended to limit this disclosure. The various components of the panels illustrated in the figures may have some or all of the features described above.

FIG. 1 is a cross-sectional and expanded view of a first embodiment of panel 10 according to the present disclosure. Panel 10 comprises plastic composite core or mineral composite core 3 and protective layer 1 disposed above core 3. In some embodiments, core 3 can be waterproof and/or solid as opposed to foamed. In some embodiments, protective layer 1 can be a substantially transparent paper impregnated with a melamine resin wherein the melamine resin comprises wear resistant particles, such as, but not limited to, aluminum oxide particles. Panel 10 further comprises décor layer 2 disposed above core 3. In some embodiments, décor layer 2 can be a PVC film comprising a printed motif.

Adhesive layer 11 is positioned between protective layer 1 and décor layer 2 forming a bond between protective layer 1 and décor layer 2. An optional balancing layer 4 is shown in FIG. 1. In some embodiments, balancing layer 4 can include a paper impregnated with a melamine resin. Balancing layer 4 is bonded to a bottom surface of core 3 via second adhesive layer 12. While the use of a balancing layer 4 is not required, in some embodiments, it can be advantageous because balancing layer 4 can mitigate or avoid the effects of environmental changes on the finished panel 10. For instance, the use of balancing layer 4 balances tension created by protective layer 1, thereby improving the dimensional stability of panel 10 and prevent warping overtime. Likewise, an optional cushioning pad 6 may be adhered on the bottom surface of balancing layer 4 by third adhesive layer 5. If no balancing layer 4 is used, then cushioning pad 6 would be adhered to bottom surface 17 of core 3. Any cushioning pad known in the art can be used such as foamed EVA, PVC, PE, PP, PU, polystyrene (PS) pad, a cork pad, or a pad made with natural fibers (e.g., jute, coconut, cellulose, straw, among others)

Figure 2:
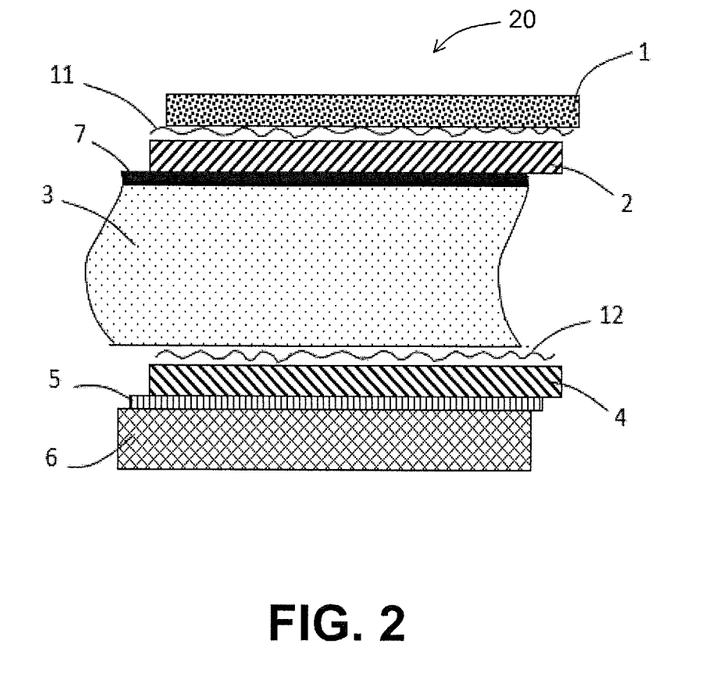
FIG. 2 is a cross-sectional view of a second embodiment of a panel according to the present disclosure, the panel comprising a waterproof solid polymer-based or mineral-based core, a protective layer comprising a melamine-impregnated paper, and an upper sublayer.

FIG. 2 is a cross-sectional, expanded view of a second embodiment of a panel 20. Panel 20 has a similar construction to the embodiment of FIG. 1, but further comprises an optional upper sublayer 7 positioned between décor layer 2 and core 3. Sublayer 7 is a PVC layer, but may alternately comprise cork, EVA, PE, PP, PU, or PET. Sublayer 7 can be advantageous because it can improve comfort underfoot, reduce sound transmission, and increase the dimensional stability of panel 20.

Figure 3:
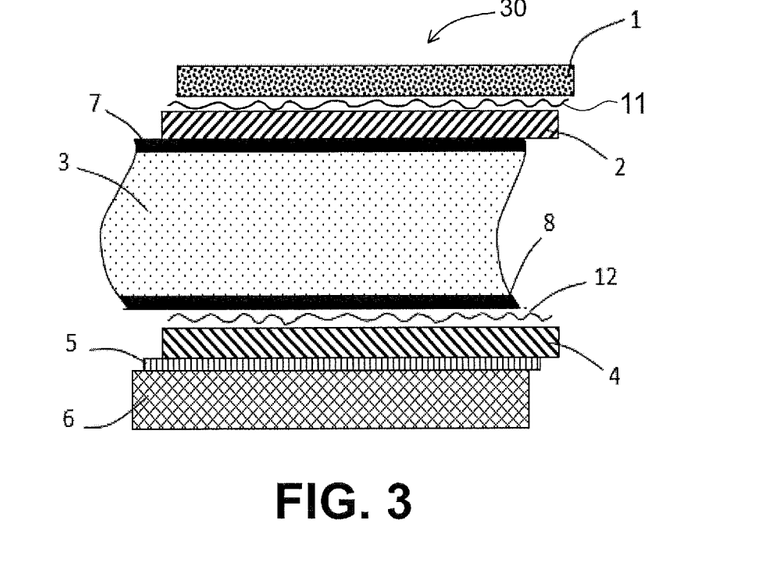
FIG. 3 is a cross-sectional view of a third embodiment of a panel according to the present disclosure, the panel comprising a waterproof solid polymer-based or mineral-based core, a protective layer comprising a melamine-impregnated paper, and a lower sublayer.

FIG. 3 is a cross-sectional, expanded view of a third embodiment of a panel 30. Panel 30 has a construction similar to the embodiment of FIGS. 1 and 2, but further comprises an additional lower sublayer 8 positioned below core 3 and balancing layer 4. In some embodiments, lower sublayer 8 is made of the same material as upper sublayer 7 (e.g., PVC) though other materials may also be substituted, such as cork, EVA, PE, PP, PU, or PET. The lower sublayer 8 can be advantageous because it can improve the dimensional stability of panel 30 by creating a balanced structure to reduce potential internal tensions within the panel, similar to that discussed above with respect to FIG. 1.

In some embodiments, sublayers 7 and 8 shown in FIGS. 2 and 3 can be produced by a calendaring process to improve comfort underfoot. Alternatively, in some embodiments, sublayers 7 and 8 may be produced by an extrusion process or continuous process. If core 3 and sublayers 7 and 8 are all produced with the same production process, it is possible to "sandwich" these layers in a single process to reduce cost. For example, a co-extrusion process may be used to produce the layers in a continuous form which is then cut to the desired length.

Figure 4:
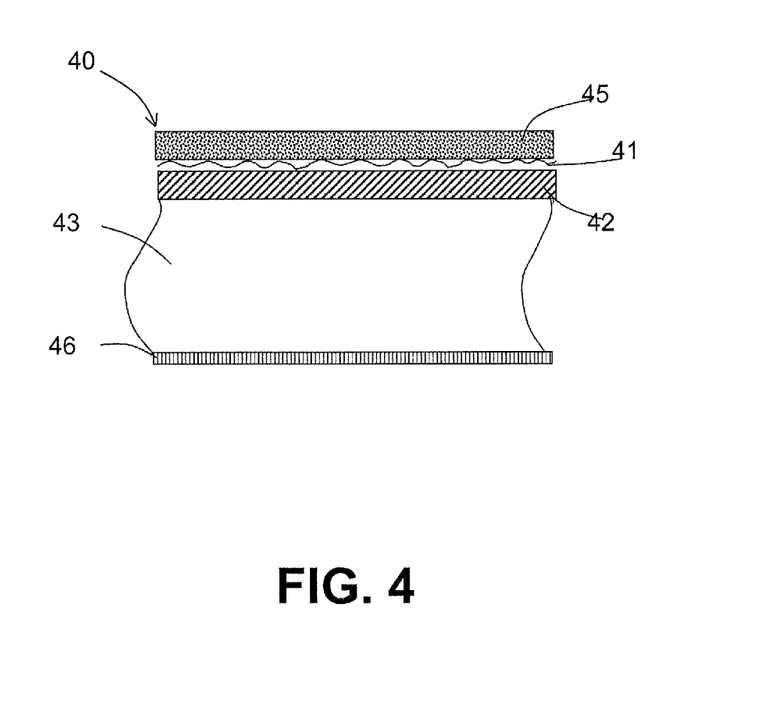
FIG. 4 is a cross-sectional view of a fourth embodiment of a panel according to the present disclosure, the panel comprising a waterproof solid polymer-based core having a layer in which the melamine resin and adhesive are combined prior to application to the core.

FIG. 4 is a cross-sectional, expanded view of a fourth embodiment of a panel 40. Panel 40 includes a plastic composite core 43 and a décor layer 42 disposed above core 43. In some embodiments, décor layer 42 may comprise a printed PVC film, in which case décor layer 42 can be adhered or bonded to core 43 by a waterproof adhesive layer (not shown in FIG. 4). Décor layer 42 may further include a decorative motif (not shown) printed thereon. Décor layer 42 may alternatively comprise a paper having a decorative motif (not shown) printed thereon, or it may comprise a decorative layer of vinyl, rubber, or another suitable thermoplastic. In another embodiment, décor layer 42 may alternatively comprise an upper portion of core 43 itself, core 43 having a digitally printed decorative motif (not shown) printed directly on core 43, or digitally printed indirectly such as with screen printing and the like.

Figure 10:
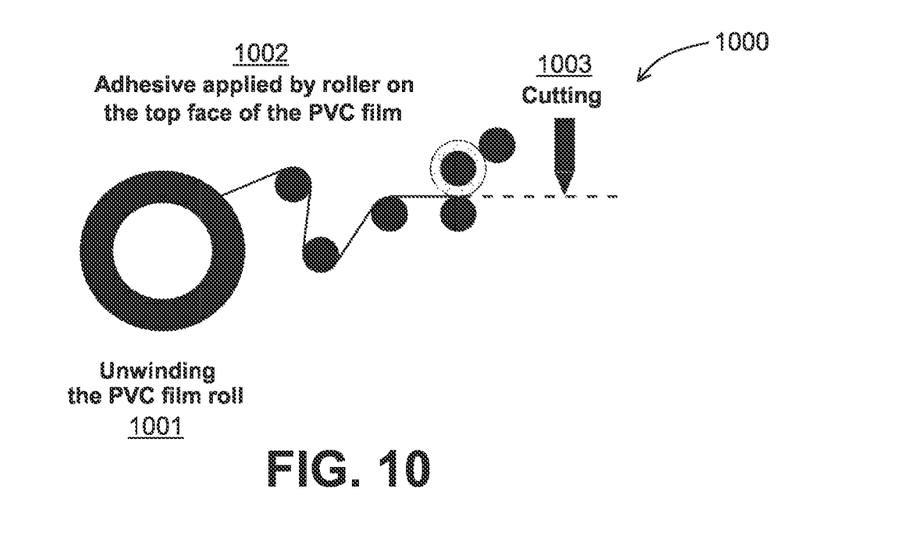
FIG. 10 is an illustration of an alternative method of applying an adhesive layer between the melamine layer and the décor layer of a panel produced according to the present disclosure.

FIG. 4 further shows a protective layer 45 (e.g., a melamine protective layer) applied to and covering the décor layer 42. A first adhesive layer 41 is disposed between protective layer 45 and décor layer 42. In some embodiments, protective layer 45 and first adhesive layer 41 of the panel illustrated in FIG. 4 may be applied by roller applicator on top of the décor layer 42, as illustrated for instance in FIG. 10a (discussed below).

As with previous embodiments, panel 40 may further comprise a balance layer 46.

Figure 5:
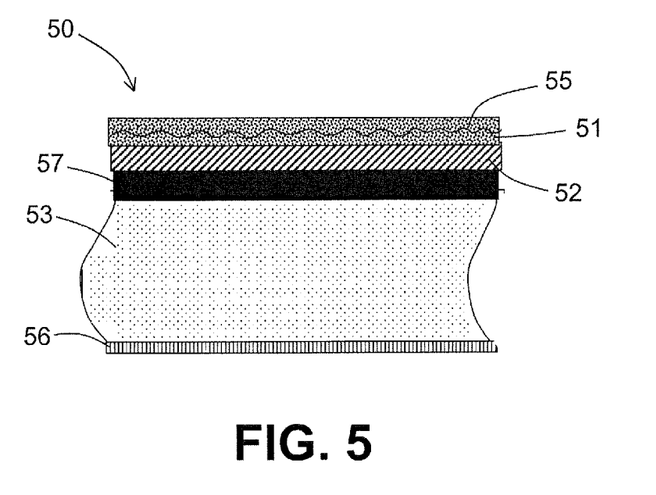
FIG. 5 is a cross-sectional view of a fifth embodiment of a panel according to the present disclosure, the panel comprising a co-extruded waterproof solid polymer-based core having a melamine scratch-resistant layer.

FIG. 5 is a cross-sectional, expanded view of a fifth embodiment of a panel 50. Panel 50 is similar to the embodiment in FIG. 4 except that adhesive layer 51 is incorporated into the protective layer 55. For instance, adhesive layer 51 can be incorporated into the protective layer 55 via the roller coat application illustrated in FIG. 10b. In panel 50 of FIG. 5, core 53 is a foamed core, containing air pockets (not shown). A soft layer 57 is placed between décor layer 52 and core 53 to enhance the acoustic performance (i.e., making it a quieter surface). Soft layer 57 may comprise cork, PVC, rubber or any other suitable material exhibiting sound absorbing or dampening characteristics. Soft layer 57 is adhered between décor layer 52 and core 53 by second and third adhesive layers (not shown). Because the foamed core 53 is porous, an adhesive is necessary to bond soft layer 57 and foamed core 53. Panel 50 may further comprise a balance layer 56.

Figure 6:
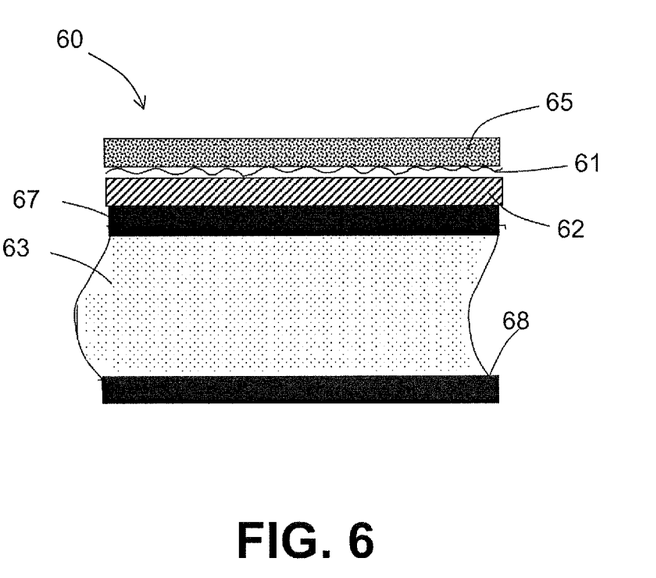
FIG. 6 is a cross-sectional view of a sixth embodiment of a panel according to the present disclosure, the panel comprising a virtually transparent thermoplastic layer bonded between the protective layer and the décor layer.

FIG. 6 is a cross-sectional, expanded view of a sixth embodiment of a panel 60. The embodiment of a panel 60 produced according to the present invention shown in FIG. 6 is similar in construction to panel 60 of FIG. 6, but in this embodiment, core 63 is co-extruded, which means that sublayers 67 and 68 are extruded at the same time as core 63 and bonded to or fused with core 63 as part of the co-extrusion process. Core 63 preferably comprises a foamed core having a density between about 600 kg/m³ to about 2,000 kg/m³. Décor layer 62 is fused to the top sublayer 67 during the extrusion process as well. Melamine protective layer 65 is roller-applied to coat and cover the décor layer 62 and a first adhesive layer 61 is used between protective layer 65 and décor layer 62 to ensure optimal adhesion.

Figure 7:
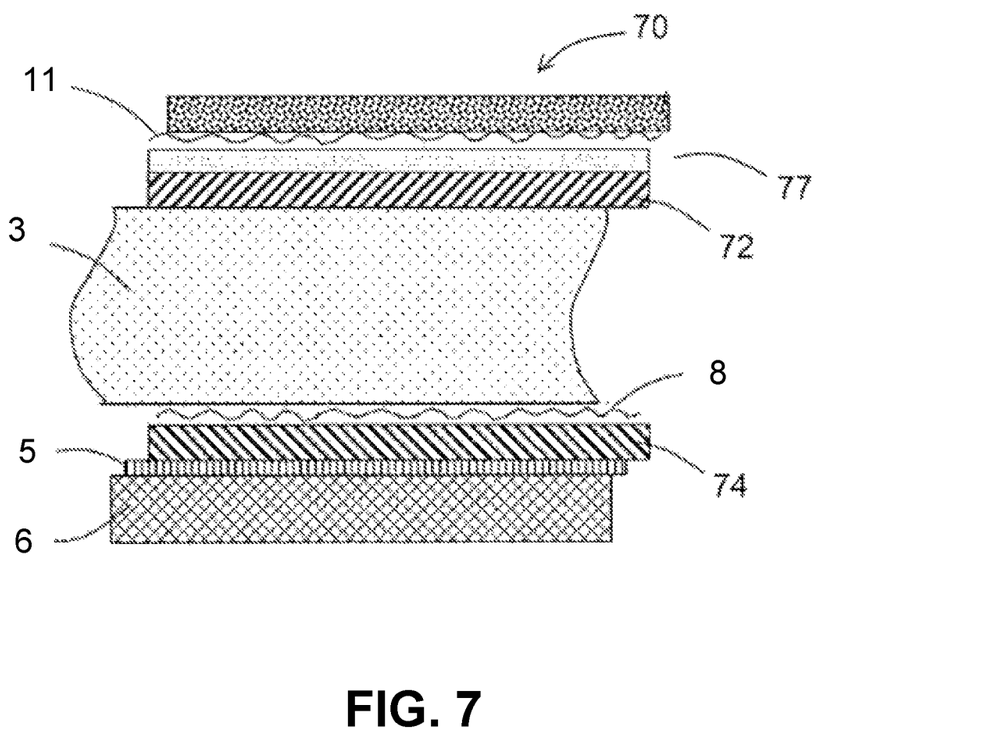
FIG. 7 is a cross-sectional view of a seventh embodiment of a panel according to the present disclosure.

FIG. 7 is a cross-sectional, expanded view of another alternative embodiment of a panel 70 produced according to the present disclosure. Panel 70 is similar in construction to FIG. 1 but further comprises a thermoplastic layer 77 between décor layer 72 and protective layer 71. In some embodiments, thermoplastic layer 77 preferably can comprise PVC, but other materials may alternately be used, such as, but not limited to, PET, PU, and PE. Additionally, thermoplastic layer 77 can be a virtually transparent thermoplastic layer.

Bonding a virtually transparent thermoplastic layer 77 between décor layer 72 and protective layer 71 allows the use of a lighter melamine-impregnated paper as protective layer 71 and balancing layer 74, which helps to improve the dimensional stability of the product. In this case, the melamine-impregnated paper used as protective layer 71 has a weight of between about 10 g/m² to about 35 g/m² and, in an example embodiment, of about 20 g/m². The weight of the paper of the balancing layer 74 can be from about 10 g/m² to about 140 g/m², and in an example embodiment, about 90 g/m². Incorporating a lightweight melamine impregnated paper as the protective layer provides superior scratch resistance. In some embodiments, a virtually transparent thermoplastic layer 77 may be included to improve wear resistance. In some embodiments, the virtually transparent thermoplastic layer 77 may comprise a transparent PVC wear layer. The thickness of the virtually transparent thermoplastic layer 77 can vary from about 0.1 mm to about 0.7 mm and in some embodiments is about 0.3 mm.

Figure 8A:
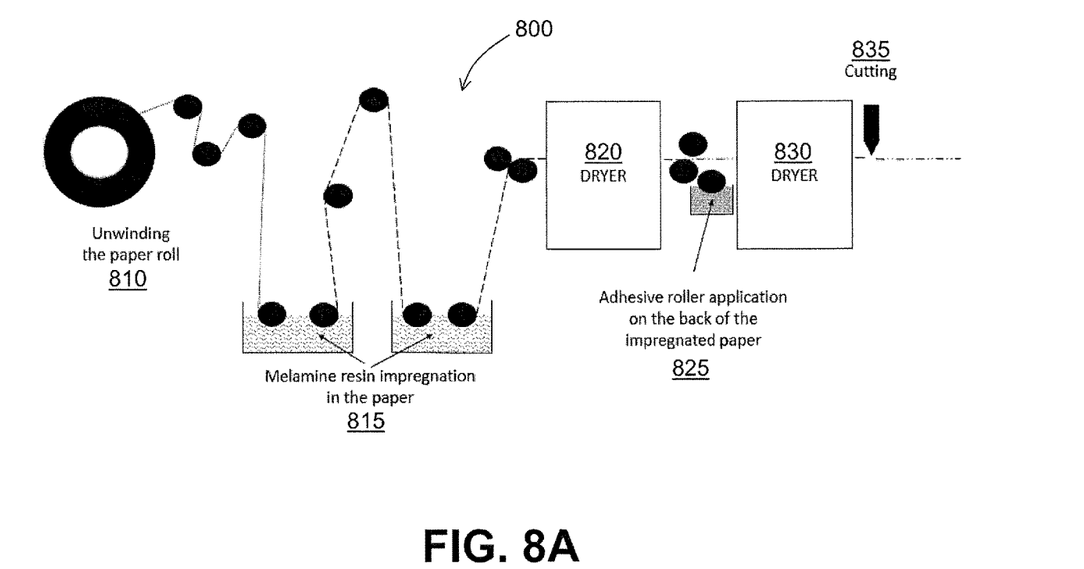
FIG. 8a is a schematic representation of a first alternative method of impregnating a paper layer with a melamine resin and applying an adhesive.
Figure 8B:
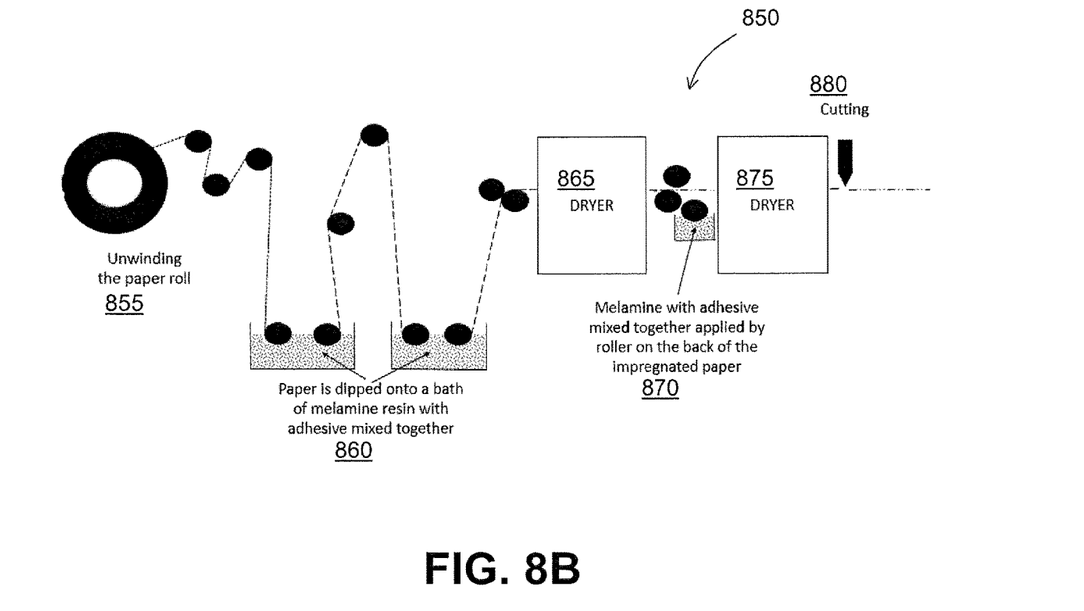
FIG. 8b is a schematic representation of a first alternative method of impregnating a paper layer with a melamine resin and applying an adhesive.

FIGS. 8a and 8b illustrate example methods for applying an adhesive layer for joining or bonding the protective layer to the core. A first method 800, shown in FIG. 8a, comprises unwinding a paper roll 810 comprising a paper to be impregnated, impregnating the paper with a melamine resin 815, drying the impregnated paper in a dryer 820, applying an adhesive on a back surface of the impregnated paper using a roller application 825, drying the impregnated paper in a dryer 830, and then cutting the impregnated paper 835 to a size sufficient to apply to a core. In some embodiments, when the resin-impregnated paper is dried in the first drying process, the resin is about 80% dried after the drying process.

In some embodiments, the impregnated paper can be applied to the core using a hot press process. There are 3 types of hot press processes that may be used to apply the paper to the core: single daylight hot press, multilayer process, and continuous press. In embodiments incorporating a multilayer hot process, multiple layers (e.g., wear layer, protective layer, décor layer, and core layer) intended to be pressed together are sandwiched between two plates. Once all the layers are loaded on the plates, the press is closed and heat is added to each plate. A pressure of 8 MPa to 18 Mpa can be used during the heat phase at a temperature of around 40° C. for about 20 minutes.

In embodiments incorporating a single daylight press, layers are positioned between two plates and the press is closed. The plates are pressed together at a pressure of between 16 and 21 MPa at a temperature of around 190° C. for about one minute. In embodiments incorporating a continuous press, layers are positioned between two conveyer belts that are heated and caused to apply a continuous pressure on the layers.

Another example method 850, shown in FIG. 8b, comprises unwinding a paper roll 855, dipping the paper into a bath comprising a mixture of melamine resin and adhesive 860, drying the impregnated paper in a dryer 865, applying an adhesive layer comprising a mixture of melamine and adhesive using a roller application on a back surface of the impregnated paper 870, drying the paper in a dryer 875, and cutting the paper 880. This method differs from that described in FIG. 8a in that the adhesive layer is not separately applied.

Figure 9A:
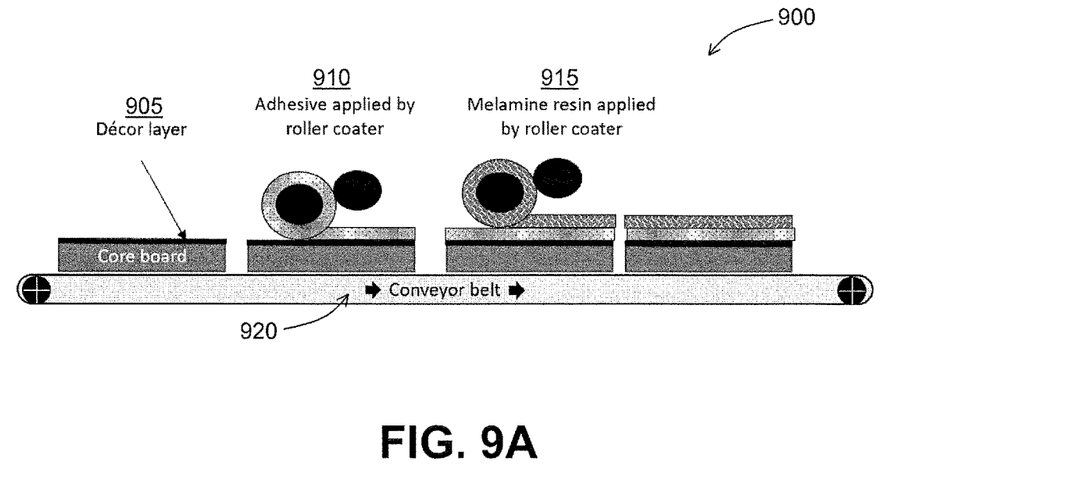
FIG. 9a is a schematic representation of a first alternative method of applying a polyurethane adhesive layer immediately below the melamine protective layer for a panel produced according to the present disclosure.
Figure 9B:
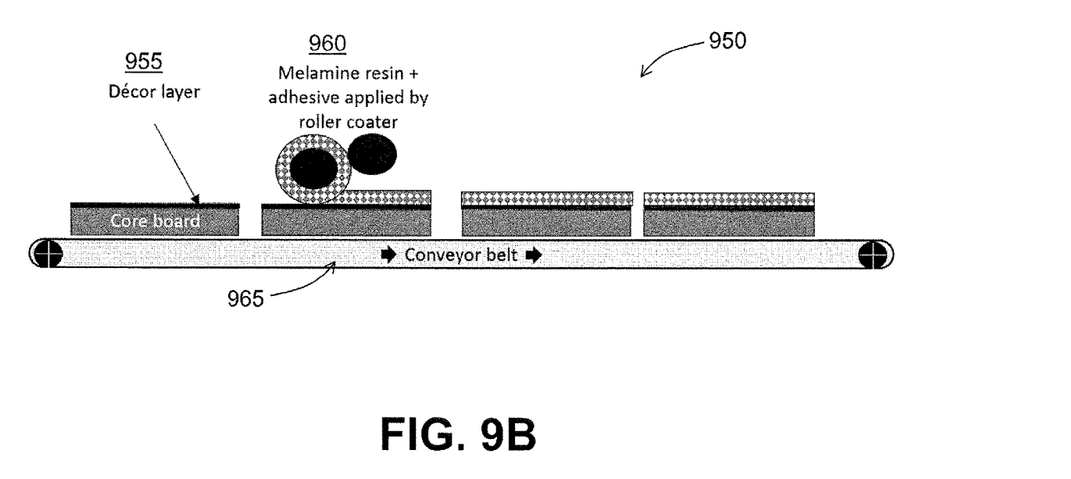
FIG. 9b is a schematic representation of a second alternative method of applying adhesive to a plank produced according to the present disclosure, wherein the adhesive is combined with the melamine resin, thereby creating a formulation which is then used to impregnate the paper.

Another method of applying the polyurethane adhesive to create a panel according to the present invention is illustrated in FIGS. 9a and 9b and comprises the steps of applying the adhesive on the surface of the core board with a roller applicator. The core may be either a polymer-based or mineral-based core with or without a décor layer (and any intermittent layers between the core and the décor layer). As explained above, the décor layer can be an image printed directly on the core surface, or it can be a decorative film or paper, or a wood veneer. The décor layer can have a substantially smooth surface or may be embossed. In an example embodiment, in-register embossing is used to provide a more realistic look to the finished product.

FIG. 9a is a schematic representation of a first process 900 incorporating a conveyer belt 920 and roller application. The first process 900 comprises applying a first adhesive layer using a roller coating application 910 to a top surface of a décor layer 905, and then applying a melamine resin layer using a roller coating application 915 to a top surface of the adhesive layer.

FIG. 9b is a schematic representation of a second process 950 incorporating a conveyer belt 965 and roller application. The second process 950 comprises applying a mixture of a first adhesive and melamine resin using a roller coating application 960 to a top surface of a décor layer 955. While FIGS. 9a and 9b show only the application of a single coating layer of the combination, but the application steps of both processes can be repeated as necessary to apply several coats to reach the desired amount or quantity of the resin being applied. In some embodiments, the temperature range for the process can be between about 50° C. to about 150° C. for this coating process and can more specifically be between 120° C. and 140° C.

In some embodiments, when several layers are applied, it is possible to add urethane resin as well to improve the application process to reduce the tackiness of the surface and improve the adhesion of the various layers.

FIG. 10 is a schematic representation of a process 1000 for applying an adhesive layer (e.g., a polyurethane adhesive) between the melamine layer and the décor layer, such as the embodiment shown in FIG. 1. This process 1000 comprises unwinding the PVC film roll 1001, utilizing a roller to apply the adhesive on the upper surface of the décor layer 1002, such as a PVC film, and cutting the plank 1003. The depicted process can be used for other décor materials as described above. The adhesive application is generally controlled to produce an application of between about 10 g/m$^2$ to about 100 g/m$^2$, and preferably between about 20 g/m$^2$ to about 50 g/m$^2$. For this process, the adhesive may be a water-based adhesives (e.g., TRIS acetate based adhesives and polyurethane-based adhesives) since such adhesives dry quickly to be able to package the panels at the end of the manufacturing process.

Another advantage of the present disclosure is that improved 3D texturing can be used to improve the appearance of the panels. Another pair of related prior patents, U.S. Pat. No. 7,763,345 (the "'345 Patent") and European Patent No. 2248665 (the "'665 Patent"), describe an aminoplast resin top layer, but the aminoplast material is again an HPL layer. HPL was used by the owner of these patents several years ago to make a flooring product, but that product quickly disappeared from the market because of the complexity and high cost of the process. The product described in the '345 and '665 Patents has an HPL top layer and a thermoplastic core, the HPL top layer is produced separately first as a separate sheet and completely cured. Subsequently, the top layer is pressed on top of the core. The depth of 3D texturing of the surface of products produced according to the '345 and '665 Patents is limited to the thickness of the HPL itself. 3D texturing cannot extend into the core of products produced according to these prior art patents because the protective layer is separately produced and cured before being applied to the core. In the present invention, there is no need for this first separate process and therefore 3D texturing can extend into the core of the products.

Figure 11A:
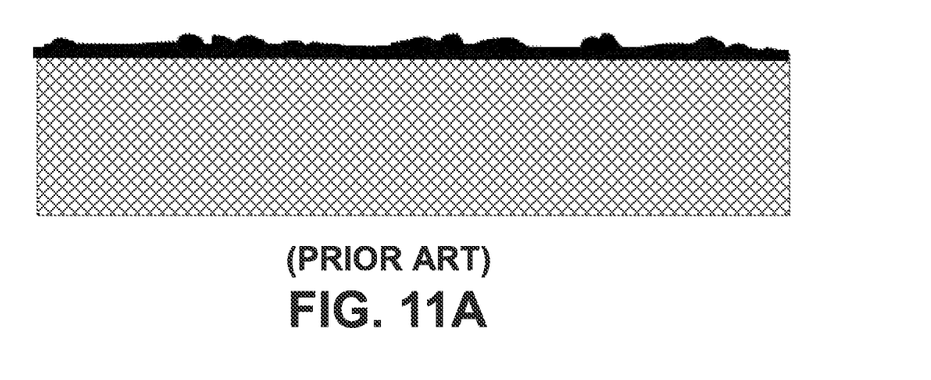
FIG. 11a is a graphical representation of a cross-sectional view of a prior art panel illustrating the depth of embossment of a wear layer to the core of the plank.

A cross-sectional view of the prior art panel produced according to the '345 and '665 Patents, is illustrated in FIG. 11a. In FIG. 11a, the solid portion represents the HPL top layer. The cross-hatched areas represent the thermoplastic core. As can be seen, the 3D texture is embossed only in the HPL itself. The 3D texture does not extend into the thermoplastic core. The use of a thicker layer of HPL for this product would allow for the creation of a deeper texture and result in a more realistic look, but the use of a thicker HPL layer in connection with the invention of the '345 and '665 Patents would considerably increase the cost of the product, rendering such a product economically infeasible.

Figure 11B:
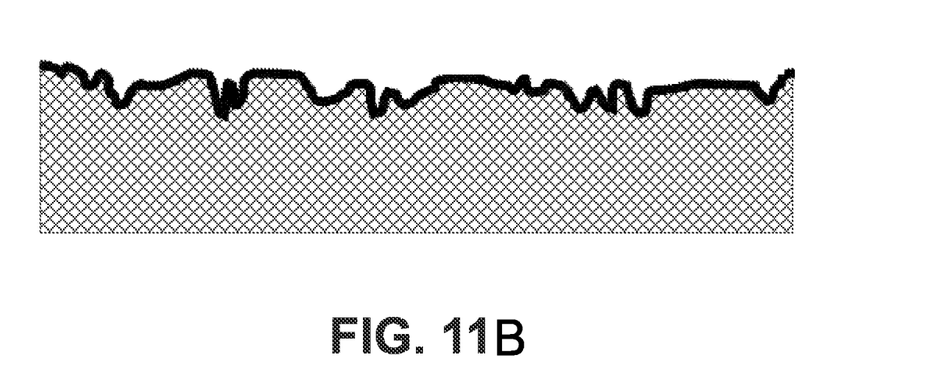
FIG. 11b is a graphical representation of a cross-sectional view of plank produced according to the present disclosure illustrating the depth of embossment of the protective layer to the core.

In contrast, FIG. 11b illustrates how utilizing the process of the present disclosure provides the ability to emboss the wear layer and a portion of the core, thereby enabling for deeper embossing, a significantly improved 3D texture and, thus, a more natural appearance. In FIG. 11b, the solid colored area represents the impregnated paper and the cross-hatched area represents the thermoplastic core. The 3D texture may be embossed into the core itself, effectively stamping the impregnated paper into the core. This enables the product to carry a very deep texture which results in a finished product having a much more realistic-look.

FIGS. 12-13 illustrate example embodiments of panels (1100 and 1200) comprising a plurality of layers including a combined protective layer and décor layer (1101 and 1201). The panels illustrated in FIGS. 12-13 can generally have the same construction as the panel illustrated in FIG. 1, with the exception of the top layer. FIG. 12 illustrates a décor layer 1101 impregnated with a melamine resin and adhered to the top surface of a composite core 3 via a separate adhesive layer 11. FIG. 13 illustrates an alternative embodiment in which a décor layer 1201 is impregnated with a melamine resin combined with an adhesive 9 to adhere the décor layer 1201 to the top surface of the composite core 3. FIG. 13 additionally comprises a balancing layer 4 also impregnated with melamine resin and an adhesive 12 to adhere the balancing layer to the bottom surface of the composite core 3, as shown for instance with respect to FIGS. 1 and 3. In some embodiments, the décor layer can be impregnated with the melamine resin by the manufacturing processes described in FIGS. 8a and 8b and the panels can further be formed by the manufacturing processes described in FIGS. 9a-10.

As used herein, the term "décor layer" may refer to a layer providing a decorative effect to a plank but also providing protection against wear caused by normal usage of the planks, including but not limited to abrasion-resistance, scratch-resistance, and/or water-proofing. The decorative effect can comprise a printed motif illustrative of a type of flooring décor (e.g. hardwood, tile, stone etc.). The decorative effect may be provided by one or more processes including rotogravure or digital print technology.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

We claim:
1. A panel comprising:
 (a) a single top layer comprising a paper impregnated with a melamine resin, an adhesive, and abrasion-resistant particles; and
 (b) a rigid core comprising:
  (i) magnesium oxide;
  (ii) magnesium salt; and
  (iii) 40% or less of wood fibers;
 (c) wherein the single top layer is directly laminated to an upper surface of the rigid core, and
 (d) wherein the single top layer comprises a topmost surface that further comprises the paper.

2. The panel of claim 1, wherein the paper is substantially transparent.

3. The panel of claim 1, wherein the paper of the single top layer has a weight of from 10 g/m² to about 150 g/m².

4. The panel of claim 1, wherein the rigid core is composed of about 40% to about 55% magnesium oxide and about 20% to about 35% magnesium salt.

5. The panel of claim 1, wherein the panel has a deep scratch resistance as measured by ISO 1518 of 20N to 30N.

6. The panel of claim 1 further comprising a balancing layer bonded to a bottom surface of the rigid core, the balancing layer impregnated with a melamine resin.

7. The panel of claim 1, wherein the rigid core further comprises an edge locking system.

8. The panel of claim 1, wherein the density of the rigid core is about 1200 kg/m³ to about 2000 kg/m³.

9. The panel of claim 1, wherein the adhesive has a delta E<1 and a heat resistance of from 130° C. to 200° C.

10. The panel of claim 1, wherein the single top layer is directly laminated under heat and pressure and fully cured in a single process.

11. The panel of claim 10, wherein the pressure is from 16 MPa to 21 MPa.

12. The panel of claim 1, wherein the single top layer is composed of no more than two papers impregnated with a melamine resin and an adhesive.

13. The panel of claim 1, wherein the single top layer functions as both a protective layer and a décor layer.

14. The panel of claim 6, further comprising a sublayer disposed between the balancing layer and the rigid core.

15. The panel of claim 1, wherein the panel is one of a wall or a floor covering.

16. The panel of claim 1, wherein corresponding overlapping portions of the single top layer and the rigid core are embossed, thus forming a three-dimensional texture on an exterior surface of the panel.

17. The panel of claim 1, wherein the magnesium oxide and the magnesium salt in the rigid core form a magnesium oxychloride cement.

18. A panel comprising:
  (a) a single top layer comprising a paper impregnated with a melamine resin, an adhesive, and abrasion-resistant particles; and
  (b) a rigid core comprising:
    (i) magnesium oxychloride cement; and
    (ii) 40% or less of wood fibers;
  (c) wherein the single top layer is fully cured and directly laminated to an upper surface of the rigid core in a single process;
  (d) wherein the single top layer comprises a topmost surface that further comprises the paper.

19. The panel of claim 18, wherein the panel is one of a wall covering or a floor covering.

20. The panel of claim 18, wherein the single top layer does not comprise more than two papers therein.

* * * * *